United States Patent [19]

Muralidhara et al.

[11] Patent Number: 5,049,248
[45] Date of Patent: Sep. 17, 1991

[54] LIQUID SEPARATION PROCESS FOR SUSPENSIONS BY A PULSATING ELECTRICAL CURRENT

[75] Inventors: Harapanahalli Muralidhara, Dublin; Cecil L. Criner, Columbus, both of Ohio

[73] Assignee: Battelle Memorial Institute, Columbus, Ohio

[21] Appl. No.: 307,025

[22] Filed: Feb. 6, 1989

Related U.S. Application Data

[63] Continuation-in-part of Ser. No. 938,707, Dec. 8, 1986, Pat. No. 4,802,964.

[51] Int. Cl.$^5$ .................... C02F 1/469; B01D 43/00
[52] U.S. Cl. ........................... 204/180.1; 204/300 R; 204/299 R; 204/130; 204/131; 204/149
[58] Field of Search ............... 204/300 R, 299 R, 130, 204/131, 149, 180.1

[56] References Cited

U.S. PATENT DOCUMENTS

| | | | |
|---|---|---|---|
| 2,740,756 | 4/1956 | Thomas | 204/299 R X |
| 4,331,525 | 5/1982 | Huba et al. | 204/180.1 |
| 4,561,953 | 12/1985 | Muralidhara et al. | 204/301 X |
| 4,671,874 | 6/1987 | Fremont et al. | 204/300 R X |
| 4,747,920 | 5/1988 | Muralidhara et al. | 204/301 X |
| 4,802,964 | 2/1989 | Muralidhara et al. | 204/301 X |

Primary Examiner—John F. Niebling
Assistant Examiner—John S. Starsiak, Jr.
Attorney, Agent, or Firm—Klaus H. Wiesmann

[57] ABSTRACT

A method of removing liquid from a suspension by concurrently subjecting the suspension to the action of a pulsed D.C. electrical field and in a second embodiment a concurrent sonic or ultrasonic field so as to remove liquid from the suspension. The suspension is moved into a liquid removal chamber between opposing electrodes one of which is permeable to the liquid. The sonic or ultrasonic field may then be optionally applied to the suspension concurrently with the pulsed electrical field, at a frequency and amplitude adapted to cause liquid to separate from the suspension particles. The concurrently applied electrical field between the electrodes causes the particles to migrate away from the permeable electrode and liquid to migrate toward the permeable electrode. Liquid is then removed through the permeable electrode. The method requires less energy to remove a unit of liquid, has a more advantageous rate of liquid removal and achieves a lower moisture content than if a steady electrical field is applied.

17 Claims, 2 Drawing Sheets

LIQUID SEPARATION PROCESS FOR SUSPENSIONS BY A PULSATING ELECTRICAL CURRENT

The present application is a continuation-in-part of a pending application having Ser. No. 06/938,707 filed Dec. 8, 1986, now U.S. Pat. No. 4,802,964, issued Feb. 7, 1989.

FIELD OF THE INVENTION

This invention relates to a method for concentrating finely divided solids in colloidal suspensions sludges or fine particle slurries in water by applying a pulsating D.C. electrical field thereto and using the pulsating unidirectional current to remove water therefrom. The method uses less energy to remove a unit of water than if a constant electrical current is used. The pulsating electrical current can also be advantageously used in conjunction with a simultaneously applied sonic or ultrasonic field.

The method has utility in removing liquids from the above mentioned examples and from those described below.

BACKGROUND OF THE INVENTION

Direct electrical current is often used to separate particles and liquids by taking advantage of the electroosmotic and electrophoretic effects produced thereby. The present invention is an improvement over U.S. Pat. No. 4,561,953 to Muralidhara et al, commonly owned by the assignee of the present patent, which is incorporated by reference as if fully rewritten herein.

Additional art beyond that cited in the Muralidhara et al patent includes a patent to Thomas U.S. Pat. No. 2,740,756 that teaches the use of radio frequencies above 15,000 cps to induce unidirectional pulses of current in material to be dried in order to move liquid out of the material electrically even with poor electrode contact or no contact at all. The energy savings and other advantages of the present invention are realized at significantly lower frequencies and with simpler equipment. Several U.S. patents to Candor teach the use of electrostatic fields to dewater various materials as for example U.S. Pat. Nos. 4,551,924; 4,236,317; 4,189,845; 4,135,307; 4,050,162; 3,931,682; and 3,641,680 among others. Of the above, the latter two patents combine vibrational energy with an electrostatic effect to remove moisture from materials. An additional patent to Roundsley U.S. Pat. No. 4,359,826 issued Nov. 23, 1982 provides a good discussion of the electrostatic art and is incorporated herein by reference.

The present invention differs from the electrostatic art in that it is important and indeed necessary that an electrical field have associated therewith an electrical current that permeates the mass of the material to be dewatered. In addition, the high voltages that are required in electrostatic drying, in the order of several thousand volts are not needed. See for example an article by Robert R. Roundsley, Drying in the Presence of an Electrostatic Field, Tappi Journal, Vol. 68, No. 6, June 1985 (Graph page 5).

BRIEF DESCRIPTION OF THE INVENTION

In accordance with the present invention there is provided a method for separating a liquid such as water or a mixture of liquids from solids in suspensions of solids. The method comprises subjecting the suspension to a pulsating electrical current so as to separate liquid from the suspension and cause a migration of the liquid and particles so as to form a region concentrated with liquid and a region depleted of liquid. Water is then withdrawn from the region where the liquid is concentrated. The energy required for an incremental amount of separation is less with the pulsating electrical current than for a steady electrical current. Various means to augment the separation process such as acoustics, centrifugation, and a vacuum among others can be used.

DETAILED DESCRIPTION OF THE INVENTION AND PREFERRED EMBODIMENT

Figure 1:
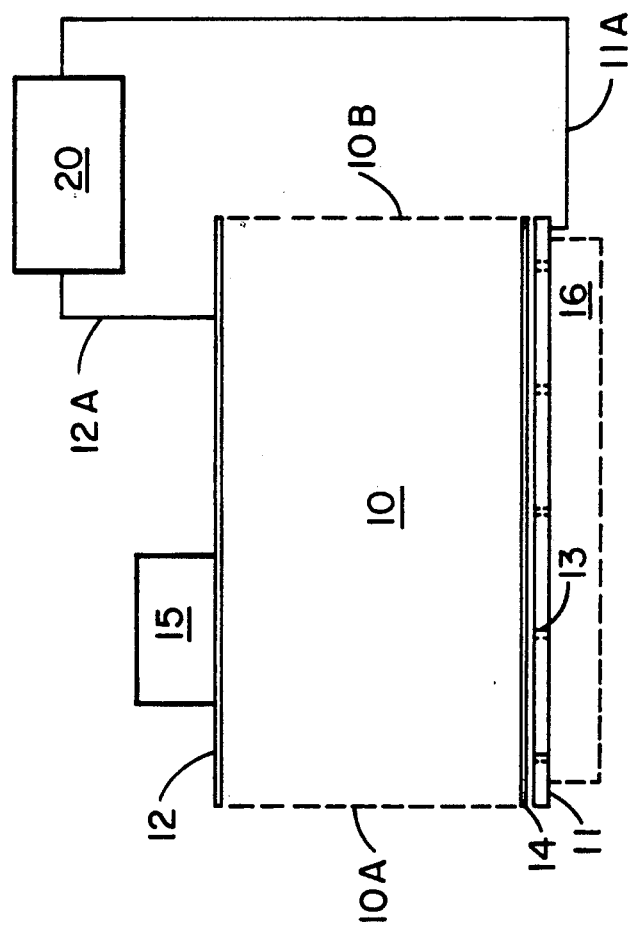
FIG. 1 illustrates, in semi schematic form, a general apparatus useful for practicing the invention.

FIG. 1 illustrates a general form of apparatus useful for practicing the method of the invention. A dewatering zone or chamber 10 is bounded by electrodes 11 and 12 that are connected to an external supply of pulsating direct current (D.C.) 20 by electrical leads 11A and 12A. Electrode 11 is water permeable with openings 13. A filter 14 may be employed if the electrode 11 does not have sufficiently small openings 13 to retain the particles in suspension.

Figure 2:
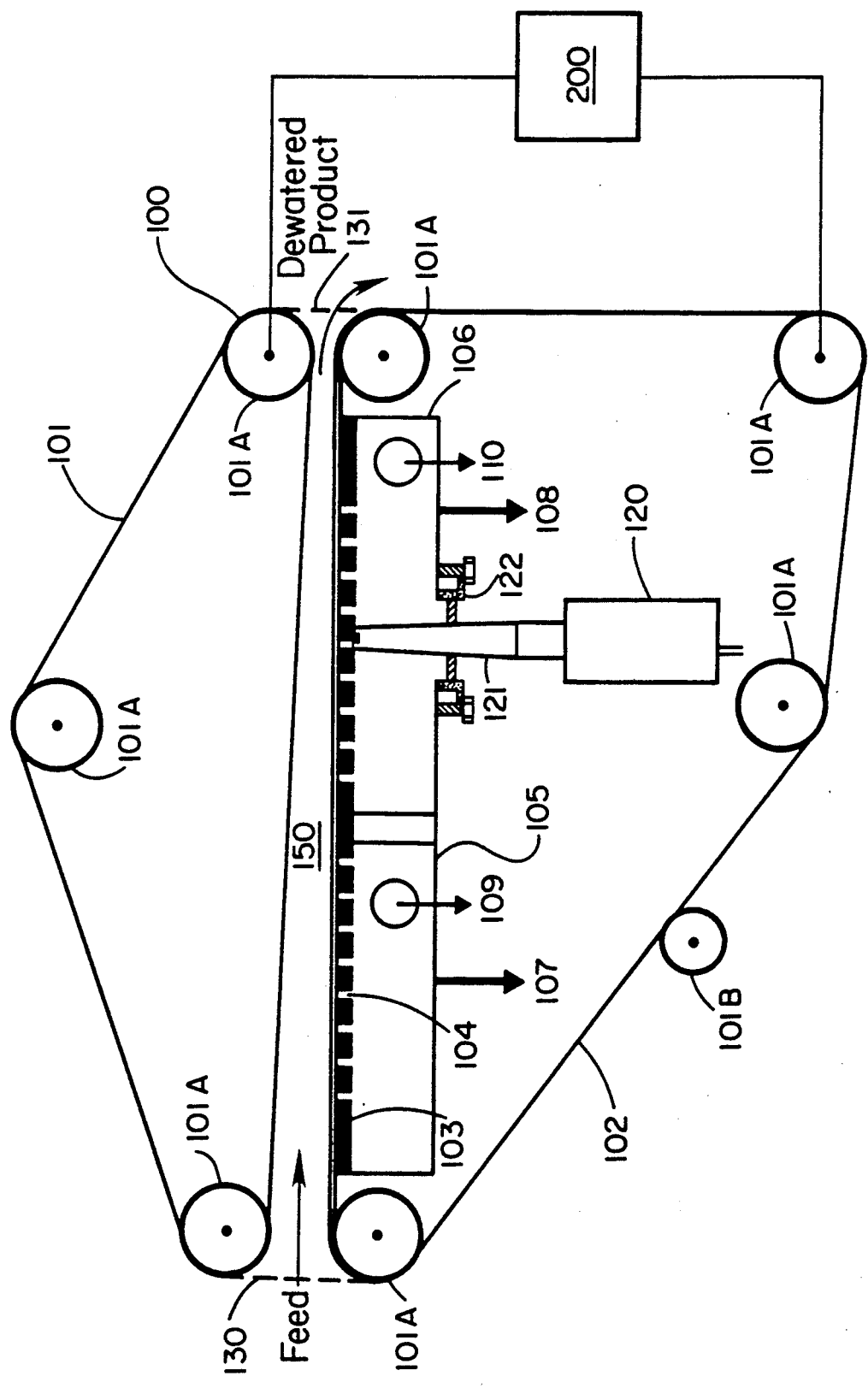
FIG. 2 illustrates, in semi schematic form, an apparatus allowing the method of the invention to be practiced on a continuous basis.

An acoustical generating means 15 produces an acoustical field having sonic or ultrasonic waves (not illustrated) that are transferred throughout the mass of the suspension in the dewatering zone 10. The acoustical generating means 15 may be located as shown in FIG. 2 or on any wall of the dewatering chamber 10 including the electrode 11 as long as the sonic or ultrasonic waves penetrate the mass of the suspension. The acoustical generating means 15 is optional in a first embodiment of the invention where only a pulsating electrical field that comprises a pulsating voltage and current are used. In a second embodiment of the invention where the teachings of the Muralidhara et al patent are combined with the present invention generating means 15 is of course required.

In operation, the suspension to be treated is moved into the dewatering zone 10 at input end 10A and optionally subjected to the acoustical field (sonic or ultrasonic) of such a frequency and amplitude as to cause separation of water from the particles in the suspension. Concurrently, a pulsating D.C. voltage and current is applied between the electrodes 11 and 12 to cause migration of changed particles in the aqueous suspension away from the water permeable electrode 11 and toward the water impermeable electrode 12 and movement of water toward the permeable electrode.

Sonic or ultrasonic waves also prevent packing of the suspended particles and facilitate flow of water toward the water permeable cathode. As the slurry passes through the dewatering zone the water is removed through the water permeable electrode 11 and the dewatered suspension emerges at the output end 10B of the zone 10. Dewatering through the water permeable electrode 11 may be increased by augmentation means 16 such as by reducing the pressure outside the permeable electrode, by increasing the pressure within the zone 10, by sonic or ultrasonic waves coupled to the water permeable electrode only, or by a combination of the above. The process of the invention is operable without these augmentation means. It is preferred, however, that augmentation means be used. The means used for reducing the pressure at the outer surface of the permeable electrode, for increasing the pressure within the dewatering zone, or coupling the acoustic energy are those conventionally used for augmenting filtration.

The dewatering zone 10 may be bounded by two walls (not shown) that connect between the two electrodes 11 and 12 so as to contain the slurry within the zone 10. The walls are insulated from the electrode by insulating materials (not shown) or the walls may be of an electrically nonconductive material.

In the second embodiment the electrical field and acoustical waves are applied concurrently while the suspension flows through the dewatering zone 10.

In other embodiments, parameters for the electrical field and acoustical energy may be changed to remove additional water from the suspension by flowing it through additional apparatus of the kind illustrated in FIGS. 1 or 2.

The frequency of operation of the sonic/ultrasonic generator 15 may be about 5,000 to 100,000 Hertz, but preferably about 20,000 to 40,000 Hertz so as to minimize the effects of audible noise on the work environment and to keep the efficiency at a high level. The amplitude of the sonic and ultrasonic waves can be any amplitude sufficient to separate water bound to particles but is preferably in the range of about 0.002 mm to 0.01 mm.

The applied pulsating D.C. electrical field may be of any magnitude that will cause a sufficient electrical voltage and a current to flow so as to cause a migration of the charged particles and water so as to improve the dewatering process by reducing total energy requirements over the above mentioned methods. The pulse rate may vary between 1/60 and 1000 cycles per second.

As the examples herein illustrate the application of a pulsating direct current will result in higher dewatering rates, higher amounts of water removed and lower energy usage per unit of water removed. It is important that the pulses of applied direct current be at the optimum pulse rate to obtain the advantages of the invention. With the ranges indicated above as guidelines, the optimum direct current pulse rate can readily be determined for various materials by those skilled in the art.

For Examples 3-4 a continuous bench-scale dewatering unit 100 was used as shown in FIG. 2. Two continuous belts 101,102 are used therein with belt 101 acting as one electrode and belt 102 as the other electrode. A perforated plate 103 supports the belt 102 and has openings 104 to allow liquid to pass into dewatering chambers 105,106. Belt 102 is permeable to allow liquid to pass through to plate 103. Two independent sections 105,106 were used to allow simultaneous measurement and observation of the filtrate from each section; however, one section covering the same space as the two units could be used. Belts 101 and 102 are supported by typical support rollers 101A and 101B respectively. Additional rollers 101C may be added around the circumference of the belts 101,102 to obtain better belt traction and help reduce belt slippage. Rollers 101A provide for electrical connection of anode belt 101 to one terminal of a D.C. pulse power supply means 200. Similarly roller 101B provide for electrical connection of permeable belt 102 to the other terminal of the pulse power D.C. supply 200. Where necessitated by the material to be dewatered polarity of belts 101,102 may be changed. Each section 105,106 has independent filter drains 107,108 and vacuum connections 109,110 to provide for connection to vacuum means (not shown). An ultrasonic transducer 120 provides acoustical energy to the dewatering unit 100 through the ultrasonic horn 121. Horn 121 is connected to plate 103 and provides for sonic energy throughout the mass of material to be dewatered by conduction through plate 103 and belt 102. The horn 121 is connected to the plate 103 through section 106 by an adapter 122 that provides for an air tight seal. By keeping the thickness of the plate 103 to a minimum and mechanically fastening the horn 121 to the plate 103 better ultrasonic coupling can be achieved with the suspension.

The belt 102 intimately contacts to the plate 103 to also provide better ultrasonic coupling.

The general operating procedure for a continuous dewatering run was typically as follows. The feed suspension was initially transferred to a graduated tank. The tank and contents were weighed. Approximately 1000 grams of the material was hand fed into the dewatering chamber. Appropriate voltage, current, and in some tests ultrasonic power levels were applied. The vacuum pump was then started, and finally the suspension was fed to the chamber. In all the experiments a vacuum was maintained. The unit was operated continuously for some time, usually an hour, before steady state test data was recorded. After the steady state was obtained under a set of predetermined experimental conditions, the actual tests were performed.

Humate sludge, melcone slurry, and corn gluten slurry were chosen as materials for batch tests.

Corn gluten slurry was also chosen for continuous dewatering tests. The slurry obtained from the processor contained 13.6 percent solids and was difficult to handle in this particular unit. Therefore, it was decided to centrifuge the slurry to increase the solids content to 27 percent. In addition to making the material easier to handle the removal of the water would provide a more stringent test for the dewatering method since liquid becomes increasingly difficult to extract as the solids content increases. This material was only used in Examples 3 or 4 (Samples 6-13).

A number of experiments were completed with the conditions listed in Table I, II, and III. A pulsed electric field was established that gave a pulsed electric current through the material to be dewatered. For comparison, a steady electric field that gave a D.C. current was used. Results from examples for these tests are also shown in the Tables.

The term electrical field as used herein denotes the application of a voltage between two electrodes that have disposed between them a suspension to be dewatered so as to cause a current to flow between the electrodes. The general term electric field thus denotes a potential difference between the electrodes and the associated current that flows therewith. In practicing the invention it is important that the electrodes maintain electrical contact with the suspension so that the current can flow through the mass of the suspension. Without this current flow the advantages of the invention will not be obtained. While the voltage remained constant throughout each test, the current varied from an initial high level to a lower level as water was removed. The current level listed in the Table is the average.

EXAMPLE 1

Typical humate sludges obtained from an ilmenite processing plant were used for Samples 1, 2 and 3 in this example. Humate sludge is a mineral sludge that is colloidal and thixotropic in nature. Major constituents of the material are iron titanates. Initial solids content is relatively low, about 18%. This material is difficult to dry as are the other materials in the examples below.

For comparison purposes and to demonstrate the difficulty with which water is separated from this material the sludge was subjected to a vacuum in an apparatus similar to that of FIG. 1 except that no electrical or acoustic energy was applied. Only a vacuum was applied to draw water through screen 11. Although 15 inches of vacuum were applied for 14 minutes no water was removed from the humate sludge. Initial and final solids content was the same.

Sample 2 was treated similarly but in addition to the vacuum a D.C. 50 volt electrical field was applied with an average current of 50.6 mA. A final solids content of 38.5% was achieved with the expenditure of 0.590 W.Hrs of electrical energy.

Finally Sample 3 was placed in the dewatering apparatus and a D.C. 50v pulse was applied at an average current of 102.1 mA. The D.C. pulse was on for 20 seconds and off for 40 seconds. This pulse is an asymmetrical 1 cycle/minute pulse and is considered to be at about the lower limit of useful pulses to be applied to the material.

It is noted that the final solids content of the slurry dewatered by the pulsing technique is somewhat lower than that obtained by application of a D.C. voltage. This is attributed to the slow asymetrical pulse rate that requires longer dewatering times but results in a lower energy usage. Interestingly, the energy required per pound of filtrate is significantly lower (12.0 W.Hr/lb versus 17.8 W.Hr/lb) than that required for direct current only.

Pulses of higher frequency are expected to result in better dewatering conditions.

EXAMPLE 2

A typical melcone slurry obtained from the well-known corn wet milling process in which gluten and oils are removed from corn was used for Samples 4 and 5. The major constituents of a melcone slurry are proteins and starch. It is a highly fibrous material. The solids content of this material is somewhat lower than the humate sludge being about 8.8%.

Samples 4 and 5 were treated with a D.C. and pulsed current respectively. The pulse rate remained the same as before (1 pulse/minute) but the "on" time was increased from 33% to 45%. Results for Sample 5 in the pulsed mode showed a dramatic reduction in energy requirements. Thus only about one half the energy was required to achieve a higher final solids content. This change indicates that a symmetrical pulse is favored (i.e. equal on/off times) at the lower frequencies since this results in greater "on" time.

EXAMPLE 3

Gluten slurry was used for Samples 6-9. This slurry is also obtained from the wet milling process but contains mainly proteins. The solids content of this material had been increased by centrifugation as noted above. Samples 6-8 were subjected to a continuous D.C. field where voltages of 13, 20 and 20 volts and current flows of 2.5, 3.5 and 3.5 mA respectively were established. Final solids contents were 45.8%, 49.4% and 48.9%. Power usages were a relatively high 10.83, 52.5, and 45.5 W.hr.

Similar conditions as in Samples 6-8 were applied to Sample 9 except that a pulsating unidirectional (D.C.) field was applied to the slurry. The pulse rate was 100 pulses per second. This resulted in a similar solids content 48.7%. Energy requirements, however, were only 5.49 w.hr, a significant improvement.

EXAMPLE 4

For comparison purposes. a gluten slurry was again used for this example. Samples 10, 11, and 12 were subjected to a combined electrical field and ultrasonic field (20,000 Hz) so that the suspension was concurrently acted on by both types of energy. In this example, however, a nonpulsating electrical field was used. Final solids contents of 47.6%, 48.16% and 49.1% were obtained that required 13.6, 46.8, and 95.0 watt hours of energy respectively.

The last sample, Sample 13, was subjected to the concurrent application of an electrical field and an ultrasonic field where the electrical field was applied in pulses so that 100 cycle per second pulses traveled through the slurry. This resulted in a significant improvement in final solids content (54%) using only 13.46 watt hours of energy.

This latter improvement is significant as it is well-known in the art that higher degrees of drying require increasing amounts of energy. That is the energy requirements needed to remove each additional unit of energy increases at a nonlinear rate so that higher amounts of drying require much greater amounts of energy.

Comparison of Samples 10 and 13 which were made under similar conditions except that a 100 cycle per second pulse was applied to Sample 13 clearly demonstrates the advantages of the invention. Although almost equal amounts of energy were used, Sample 13 that was subjected to a pulsed electrical field achieved a significantly greater final solids content.

EXAMPLE 5

Further tests were conducted for corn fibrous slurry using symmetrical pulse times. The slurry is organic and fibrous. The material is similar to that used in Samples 4 and 5 of Example 2, however, it had an initial thickness of 15.81 percent solids as received from a processing plant and was used as such in the following tests.

Results are listed in Table II. Sample size was 60 grams. Total test time for Samples 14 through 18 was ten minutes. A constant pressure of 7 psi within the dewatering zone was used throughout for all tests on Samples 14-18. In contrast to Examples 1-4, where a vacuum was used to obtain a pressure differential, the remaining examples used a positive pressure. All samples but Sample 14 had 10 watts of ultrasonic energy (about 20,000 Hz) simultaneously applied with the unpulsed direct current or pulsed direct current.

Sample 14 provided a baseline for comparison since only the pressure differential was used for this test. Final cake solids of about 24 percent were obtained with about 40.2 percent of the liquid removed by pressure differential alone. Sample 15 which also used an unpulsed direct current for five minutes obtained a final cake solids of about 28 percent with about 48.6 percent of the liquid removed. Samples 16, 17 and 18 used direct current pulses that indicated an optimum range for pulses. Sample 17 that used a pulse cycle of 3 cycles per minute (cpm) obtained the best dewatering rate and efficiency while 6 cpm and 2 cpm were less efficient. The 3 cpm pulses provided a greatly increased amount of liquid removal, about 61 percent, compared to the other pulse cycles and a greatly increased amount over the control and direct current only.

Sample 17 while obtaining the highest amount of liquid removed also required the least amount of energy per pound of liquid 0.020 Kw Hr/lb.

EXAMPLE 6

Additional tests were conducted for corn gluten. This material is similar to that of Example 3, Samples 6–13. Results are listed in Table III. The corn gluten had an initial solid content of 12.5 percent and was used as such in the following tests. A constant pressure differential of 7 psi was used for all samples. All samples but Sample 19 had 10 watts of ultrasonic energy (about 20.000 Hz) applied simultaneously with the electrical current. Sample 19 served as a control in that only a pressure differential was used to remove liquid. Sample 20 used direct current only and gave another baseline value for comparison with the pulsed samples. Samples 21, 22, and 23 were performed with pulsed direct currents using 10, 20, and 30 second pulses respectively. All samples using direct current resulted in improved dewatering values over use of pressure alone. However, the samples using pulsed direct current obtained higher final cake solids at lower energy usage per unit of liquid removed. The most efficient removal appeared to be for Sample 22 that was pulsed at 3 pulses per minute (20 second pulses). Where only 0.0156 KWH of energy were required per pound of filtrate. Sample 23 while requiring somewhat more energy than Sample 22 to obtain a higher cake solids (34 percent) still required less energy than a steady direct current.

Samples 1–13 had a vacuum generated outside the dewatering zone while Samples 14–23 had an increased pressure within the dewatering zone. The energy requirements of the means for creating a pressure difference across the water permeable electrode can be neglected since the pressure difference was used in each sample tested within each example. The controls (Samples 1, 14 and 19) established the dewatering level for a pressure differential alone. The increased dewatering obtained in the other samples is thus attributable to the application of direct current, pulsed current, and ultrasonic energy as the case may be.

A general description of the first embodiment of the invention includes removing liquid from a suspension by subjecting the suspension to a pulsating D.C. electrical field adapted to cause a migration of liquid and of particles resulting in a portion of the suspension having an increased concentration of particles and another portion having an increased concentration of liquid. Secondly, removing liquid from the portion of the suspension having an increased concentration of liquid, whereby the total amount of energy employed for separating a unit of liquid from the suspension is less than would be required by use of a D.C. electrical field to separate the unit of liquid.

A more detailed description of the first embodiment for an aqueous suspension would include flowing the suspension into a dewatering zone. Secondly, subjecting the suspension to a pulsed D.C. electrical field adapted to cause a migration of particles toward one portion of the zone and to cause a migration of water toward another portion of the zone. Thirdly, removing water from the portion of the dewatering zone toward which water is migrating. whereby the total amount of energy employed for separating a unit of water from the suspension is less than would be required by use of a D.C. electrical field to separate the unit of water.

A final description of the first embodiment describes a method of dewatering an aqueous suspension in a dewatering chamber with an inlet and discharge outlet, and having two electrodes, one of which is water permeable, forming opposing walls of the dewatering chamber that comprises flowing the suspension into the dewatering chamber and between the two electrodes. Then applying a pulsating D.C. electrical field concurrently with step a between the two electrodes adapted to cause suspended particles to migrate away from the water permeable electrode and water toward the water permeable electrode. Concurrently with the above step removing water from the suspension through the water permeable electrode and finally removing the dewatered suspension from the dewatering chamber, whereby the total amount of energy employed for separating a unit of water from the suspension is less than would be required by use of a D.C. electrical field to separate the unit of water, and optionally adding a surface modifier to the slurry before or as the suspension is flowing into the dewatering chamber. A pressure differential may be applied across the water permeable electrode whereby liquid removal is augmented.

A general description of the second embodiment that is for a method of removing liquid from a suspension comprising subjecting the suspension to an acoustical field at a frequency and amplitude adapted to cause separation of liquid bound to particles in the suspension. Concurrently with the acoustical field subjecting the suspension to pulsating D.C. electrical field adapted to cause a migration of liquid and of particles resulting in a portion of the suspension having an increased concentration of particles and another portion having an increased concentration of liquid, and finally removing liquid from the portion of the suspension having an increased concentration of liquid, whereby the total amount of energy employed for separating a unit of liquid from the suspension is less than would be required by use of a nonpulsating D.C. electrical field to separate the unit of liquid.

A more detailed description of the method for dewatering an aqueous suspension comprises flowing the suspension into a dewatering zone. Secondly, subjecting the suspension to an acoustical field at an amplitude and frequency adapted to cause a separation of water bound to particles in the suspension. Concurrently with the acoustic field subjecting the suspension to a pulsating D.C. electrical field adapted to cause a migration of particles toward one portion of the zone and to cause a migration of water toward another portion of the zone; and finally removing water from the portion of the dewatering zone toward which water is migrating, whereby the total amount of energy employed for separating a unit of water from the suspension is less than would be required by use of a nonpulsating D.C. electrical field to separate the unit of water, and optionally adding a surface modifier to the slurry before or as the suspension is flowing into the dewatering chamber.

A final detailed description of the second embodiment describes a method of dewatering an aqueous suspension in a dewatering chamber with an inlet and discharge outlet, and having two electrodes, one of which is water permeable, forming opposing walls of the dewatering chamber that comprises flowing the suspension into the dewatering chamber and between the two electrodes. Secondly, applying an acoustical field to the suspension at a frequency and amplitude adapted to separate water bound to suspended particles in the suspension. Thirdly, applying a pulsating D.C. electrical field concurrently with the acoustical field between the two electrodes adapted to cause the suspended particles to migrate away from the water permeable electrode and water toward the water permeable electrode. Fourthly, concurrently with the application of acoustic and electrical fields removing water from the suspension through the water permeable electrode and removing the dewatered suspension from the dewatering chamber, whereby the total amount of energy employed for separating a unit of water from the suspension is less than would be required by use of a nonpulsating D.C. electrical field to separate the unit of water.

The method is generally applicable to humate sludges, melcone slurries, gluten slurries and the like. The suspension may be aqueous, a mixture of water and other liquids, or nonaqueous. With the proviso that the nonaqueous suspensions need to be conducting. The suspensions capable of being dewatered by the method of the invention are readily ascertainable by those skilled in the art once knowing the teachings of the invention.

While the forms of the invention herein disclosed constitute presently preferred embodiments, many others are possible. It is not intended herein to mention all of the possible equivalent forms or ramifications of the invention. It is to be understood that the terms used herein are merely descriptive rather than limiting, and that various changes may be made without departing from the spirit or scope of the invention.

TABLE I

| Sample | Material | Vacuum inches | Time Minutes | Electrical Voltage Volts | Electrical Current mA | Electrical Energy W·Hr | Ultrasonic Energy W·Hr | Total Energy W·Hr | Pulse CPS | Energy Per Pound of Filtrate | Initial % Solids | Final % Solids |
|---|---|---|---|---|---|---|---|---|---|---|---|---|
| 1 | Hum. | 15 | 14 | 0 | 0 | 0 | 0 | 0 | 0 | 0 | 18 | 18 |
| 2 | Hum. | 15 | 14 | 50 | 50.6 | 0.590 | 0 | 0.590 | D.C. | 17.8 | 18 | 38.5 |
| 3 | Hum. | 15 | 14 | 50 | 102.1 | 0.397 | 0 | 0.397 | 20 sec on 40 sec off | 12.0 | 18 | 32.0 |
| 4 | Melc. | 20 | 15 | 58 | 410 | 5.95 | 0 | 5.95 | D.C. | 108 | 8.8 | 38.25 |
| 5 | Melc. | 20 | 15 | 58 | 450 | 2.93 | 0 | 2.93 | 27 sec on 33 sec off | 57.8 | 8.8 | 44.5 |
| 6 | Glut. | 3-4 | 20 | 13 | 2500 | 10.83 | 0 | 10.83 | D.C. | 0.012 | 25.9 | 45.8 |
| 7 | Glut. | 2-3 | 18 | 20 | 3500 | 52.5 | 0 | 52.50 | D.C. | 0.0255 | 27 | 49.4 |
| 8 | Glut. | 2-3 | 20 | 20 | 3500 | 45.5 | 0 | 45.5 | D.C. | 0.031 | 27 | 48.9 |
| 9 | Glut. | 3-4 | 20 | 11 | 3000 | 5.49 | 0 | 5.49 | 100 | 0.0066 | 27 | 48.7 |
| 10 | Glut. | 3-4 | 20 | 11 | 2800 | 10.27 | 3.3 | 13.60 | D.C. | 0.0120 | 25.9 | 47.6 |
| 11 | Glut. | 2-3 | 20 | 15 | 2500 | 28.13 | 18.75 | 46.88 | D.C. | 0.0228 | 27 | 48.16 |
| 12 | Glut. | 2-3 | 20 | 20 | 3500 | 70.0 | 25.0 | 95.0 | D.C. | 0.040 | 27 | 49.1 |
| 13 | Glut. | 3-4 | 20 | 11 | 2800 | 5.13 | 8.33 | 13.46 | 100 | 0.0144 | 27 | 54.0 |

TABLE II

ELECTROPULSE EAD TESTS CORN FIBER
MATERIAL INITIAL SOLIDS = 15.81 PERCENT
TEST PRESSURE 7 psi

| SAMPLE | TOTAL[a] TIME ON MIN | PULSE TIME ON SEC | PULSE TIME OFF SEC | DC VOLTS | AVG DC AMPS | U[b] POWER WATTS | FINAL CAKE SOLIDS % | KW HR/LB LB/LIQUID REMOVED | LIQUID REMOVED % |
|---|---|---|---|---|---|---|---|---|---|
| 14 | 0 | 0 | 0 | 0 | 0 | 0 | 23.89 | — | 40.17 |
| 15 | 5.0 | 0 | 0 | 40 | 0.633 | 10 | 27.86 | 0.0396 | 48.63 |
| 16 | 2.5 | 10 | 10 | 40 | 0.924 | 10 | 25.91 | 0.0328 | 46.29 |
| 17 | 2.5 | 20 | 20 | 40 | 0.735 | 10 | 32.69 | 0.020 | 61.34 |
| 18 | 2.5 | 30 | 30 | 40 | 0.991 | 10 | 27.21 | 0.0325 | 49.76 |

[a] Total Test Time, 10 Minutes
Initial Temperature, Room Temperature
[b] U - Ultrasonic, 20 KHz

TABLE III

ELECTROPULSE EAD DEWATERING DATA AMERICAN FRUCTOSE
CORN GLUTEN INITIAL SOLID CONTENT = 12.5 PERCENT
TEST PRESSURE 7 psi

| SAMPLE | TOTAL[a] TIME ON MIN | PULSE TIME ON SEC | PULSE TIME OFF SEC | DC VOLTS | AVG DC AMPS | U[c] POWER WATTS | KW HR LB/ FILTRATE | FINAL[b] TEMP °F. | FINAL CAKE SOLIDS % | LIQUID REMOVED % |
|---|---|---|---|---|---|---|---|---|---|---|
| 19 | 0 | 0 | 0 | 0 | 0 | 0 | Control | RT | 28.08 | 63.4 |
| 20 | 5 | 0 | 0 | 20 | 0.957 | 10 | 0.0214 | 94 | 33.16 | 71.2 |

TABLE III-continued

ELECTROPULSE EAD DEWATERING DATA AMERICAN FRUCTOSE
CORN GLUTEN INITIAL SOLID CONTENT = 12.5 PERCENT
TEST PRESSURE 7 psi

| SAMPLE | TOTAL[a] TIME ON MIN | PULSE TIME ON SEC | PULSE TIME OFF SEC | DC VOLTS | AVG DC AMPS | U[c] POWER WATTS | KW HR LB/ FILTRATE | FINAL[b] TEMP °F. | FINAL CAKE SOLIDS % | LIQUID REMOVED % |
|---|---|---|---|---|---|---|---|---|---|---|
| 21 | 2.5 | 10 | 10 | 20 | 1.398 | 10 | 0.0161 | 93 | 33.85 | 72.0 |
| 22 | 2.5 | 20 | 20 | 20 | 1.370 | 10 | 0.0156 | 93 | 33.79 | 72.0 |
| 23 | 2.5 | 30 | 30 | 20 | 1.590 | 10 | 0.0176 | 95 | 34.00 | 72.3 |

[a]Total Test Time, 10 Minutes
[b]Initial Temperature, Room Temperature
[c]U - Ultrasonic, 20 KHz

What is claimed is:

1. A method of dewatering an aqueous suspension in a dewatering chamber with an inlet and discharge outlet, and having two electrodes, one of which is water permeable, forming opposing walls of the dewatering chamber which method comprises:
   a. flowing the suspensions into the dewatering chamber and between the two electrodes;
   b. applying an acoustical field to the suspension at a frequency and amplitude adapted to cause separation of liquid bound to particles in the suspension;
   c. concurrently with step b. applying a pulsating D.C. electrical field between the two electrodes adapted to cause particles to migrate away from the water permeable electrode and water toward the water permeable electrode;
   d. removing water from the suspension through the water permeable electrode; and
   e. removing the dewatered suspension from the dewatering chamber;
   whereby the total amount of energy employed for separating a unit of water from the suspension is less than would be required by use of a nonpulsating D.C. electrical field to separate the unit of water.

2. The method of claim 1 including applying a pressure differential across the water permeable electrode whereby water removal is augmented.

3. The method of claim 1 including adding a surface modifier to the suspension before or as the suspension is flowing into the dewatering chamber.

4. A method of dewatering a suspension comprising:
   a. subjecting the suspension to an acoustical field at a frequency and amplitude adapted to cause separation of liquid bound to particles in the suspension, wherein the applying of the acoustical field is at a frequency of 5000–40,000 Hertz and at an amplitude of 0.002 to 0.01 millimeters;
   b. concurrently subjecting the suspension to pulsating D.C. electrical field adapted to cause a migration of liquid and of particles resulting in a portion of the suspension having an increased concentration of particles and another portion having an increased concentration of liquid; and
   c. removing liquid from the portion of the suspension having an increased concentration of liquid, whereby the total amount of energy employed for separating a unit of liquid from the suspension is less than would be required by use of a nonpulsating D.C. electrical field to separate the unit of liquid.

5. The method of claim 4 including applying a pressure differential to the portion of the suspension having an increased concentration of liquid whereby liquid removal is augmented.

6. The method of claim 4 including adding a surface modifier to the suspension before or as the suspension is flowing into the dewatering chamber.

7. A method of dewatering an aqueous suspension comprising:
   a. flowing the suspension into a dewatering zone;
   b. subjecting the suspension to an acoustical field at an amplitude and frequency adapted to separate water bound to particles in the suspension, wherein the applying of the acoustical field is at a frequency of about 5000 to 40,000 Hertz and at an amplitude of about 0.002 to 0.01 millimeters;
   c. concurrently subjecting the suspension to a pulsating D.C. electrical field adapted to cause a migration of particles toward one portion of the zone and to cause a migration of water toward another portion of the zone; and
   d. removing water from the portion of the dewatering zone toward which water is migrating, whereby the total amount of energy employed for separating a unit of water from the suspension is less than would be required by use of a nonpulsating D.C. electrical field to separate the unit of water.

8. The method of claim 7 including applying a pressure differential at the portion of the zone toward which water is migrating whereby water removal is augmented.

9. The method of claim 7 including adding a surface modifier to the suspension before or as the suspension is flowing into the dewatering chamber.

10. A method of dewatering an aqueous suspension in a dewatering chamber with an inlet and discharge outlet, and having two electrodes, one of which is wear permeable, forming opposing walls of the dewatering chamber which method comprises:
   a. flowing the suspension into the dewatering chamber and between the two electrodes;
   b. applying an acoustical field to the suspension at a frequency and amplitude adapted to separate water bound to suspended particles in the suspension, wherein the applying of the acoustical field is at a frequency of about 5,000 to 40,000 Hertz and at an amplitude of about 0.002 to 0.01 millimeters;
   c. applying a pulsating D.C. electrical field concurrently with step b between the two electrodes adapted to cause the suspended particles to migrate away from the water permeable electrode and water toward the water permeable electrode;

d. concurrently with step c removing water from the suspension through the water permeable electrode; and e. removing the dewatered suspension from the dewatering chamber;

whereby the total amount of energy employed for separating a unit of water from the suspension is less than would be required by use of a nonpulsating D.C. electrical field to separate the unit of water.

11. The method of claim 10 including applying a pressure differential across the water permeable electrode whereby water removal is augmented.

12. The method of claim 10 including adding a surface modifier to the suspension before or as the suspension is flowing into the dewatering chamber.

13. The method of claim 10 employing a humate sludge for the suspension.

14. The method of claim 10 employing a melcone slurry for the suspension.

15. The method of claim 10 employing a gluten slurry for the suspension.

16. The method of claim 10 wherein the pulsating D.C. electrical field pulses at a rate between 1/60 to 1000 cycles per second.

17. The method of claim 1 wherein the pulsating D.C. electrical field pulses at a rate between 1/60 to 1,000 cycles per second.

* * * * *